United States Patent [19]

Schlatter et al.

[11] Patent Number: 4,905,522
[45] Date of Patent: Mar. 6, 1990

[54] EXTREME TEMPERATURE FLOW METER

[75] Inventors: Gerald L. Schlatter; Robert L. Poland, both of Boulder, Colo.

[73] Assignee: Engineering Measurements Company, Longmont, Colo.

[21] Appl. No.: 87,558

[22] Filed: Aug. 19, 1987

[51] Int. Cl.$^4$ .............................................. G01F 1/10
[52] U.S. Cl. .................................................. 73/861.77
[58] Field of Search ............ 73/861.08, 861.14, 861.12, 73/861.77, 861.78, 861.79, 866.5, 195, 861.92, 861.23; 324/163, 166

[56] References Cited

U.S. PATENT DOCUMENTS

| | | | |
|---|---|---|---|
| 3,880,003 | 4/1975 | Jameson | 73/861.78 |
| 3,890,837 | 6/1975 | Frizzell et al. | 73/861.77 |
| 4,110,685 | 8/1978 | Leenerts | 324/58 B |
| 4,324,144 | 4/1982 | Miyata et al. | 73/861.77 |
| 4,380,934 | 4/1983 | Okuda et al. | 73/861.23 |
| 4,399,696 | 8/1983 | Feller | 73/861.77 |
| 4,535,637 | 8/1985 | Feller | 73/861.77 |
| 4,537,081 | 8/1985 | Max | 73/861.77 |

Primary Examiner—Joseph A. Orsino
Assistant Examiner—Brent A. Swarthout
Attorney, Agent, or Firm—James R. Young

[57] ABSTRACT

A flowmeter has an elongated probe with a rotor positioned at the distal end of the probe for insertion into a fluid flow and an elongated conductor in the probe that terminates adjacent the rotor. A signal generator induces a standing wave on the conductor, and rotation of the rotor, which acts as a capacitor, induces a reciprocating phase shift in the standing wave. The rate of reciprocation of the phase shift, as well as the change in amplitude at a point on the conductor, is proportional to, and indicative of, the flow rate of the fluid and is detected and measured as an instrumentation signal. The probe, rotor, circuit insulation, and seal components are all fabricated of materials that withstand extreme temperatures.

50 Claims, 6 Drawing Sheets

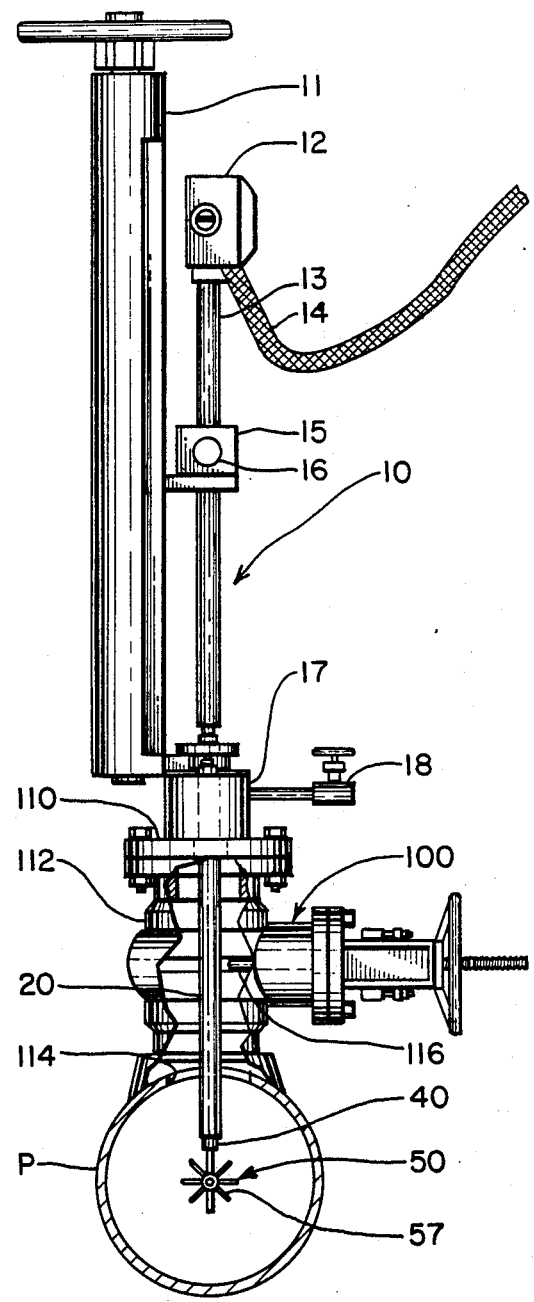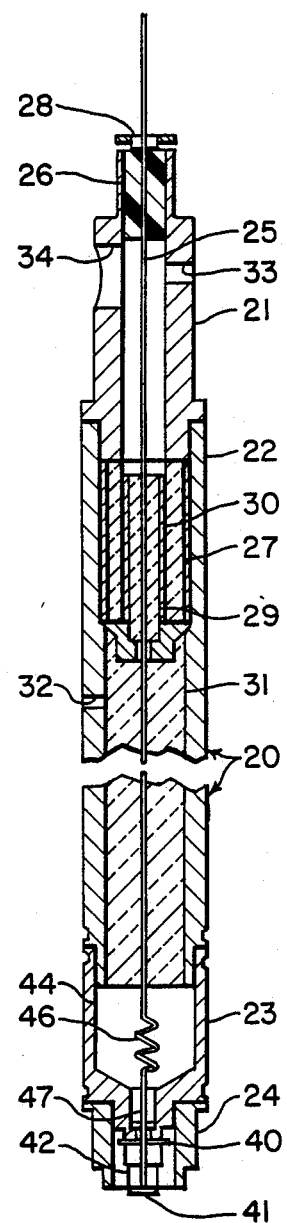
FIG. 1
FIG. 2

EXTREME TEMPERATURE FLOW METER

BACKGROUND OF THE INVENTION

A. Field of the Invention:

The present invention relates to fluid flow meters and more specifically to a method and apparatus for measuring of fluid flow including liquids, gases, and vapors, in extreme temperature ranges varying from cryogenic to greater than 1000° F.

B. Description of Prior Art

The general principles of electronics and instrumentation theory are widely known and have been applied for many years to perform real-time measurements of fluid flow, such as liquids, gases, or vapors flowing in pipelines. However, the adverse effects of temperature extremes in the flowing fluids, as well as vibrations, noise, and shocks in the flow pipes, have either prevented or impeded adequate flow measurement, and, in some circumstances, the limits of instrumentation have detracted from the effectiveness and efficiencies of plant operations.

By way of example, steam generation is a historic and widespread process used to power much of industry's machinery as well as to heat regional and commercial and industrial buildings. The ability of steam to perform work is in part determined by its temperature. Monitoring of the flow (as well as other parameters) of steam is necessary in industrial applications, from the standpoint of proper plant function, process control, efficiency, and billing. However, operations to which monitoring is critical may be limited by the temperature ranges over which the monitoring devices themselves may function. Further, operations in which avoidance of shutdown or interruption is critical may find insertion-type monitoring devices to be more suitable to their needs than full-bore meters.

In attempts to meet needs such as these, a wide variety of meters utilizing a variety of electronic instrumentation techniques have been developed and are well known in the industry. For example, turbine meters utilizing rotors and magnetic coil pickups, sonic sensors utilizing doppler frequency shifts, vortex-generating sensors, and electromagnetic sensors have widespread applications. All of these instruments and techniques, however, are limited by the degree of temperature that the electronic components associated directly with their sensors or pickup apparatus are able to withstand. The practical upper temperature limit of these devices, above which such conventional electronic instrument components in prior art devices fail, has been in the range of 750°–800° F. A measuring device that can be inserted into, and extracted from, a flow pipe and maintainable without line shutdown and which could significantly extend the upper operating temperatures limits within the pipe from the present practical limits of 750°–800° F. to above 1000° F. would significantly increase the efficiency and management capabilities of a steam system. Such a flow measuring device would be even more beneficial if it was applicable to systems employing flows of dirty or corrosive fluids as well as clean liquids, gases, or steam. Such a flow meter device that could even function at cryogenic temperatures would significantly improve the state of the art even further.

SUMMARY OF THE INVENTION

Accordingly, it is a general object of the present invention to provide a method and apparatus for measuring flow rate of fluids, such as liquids, gases, or vapors, under high or low pressure conditions and at temperatures up to and exceeding 1000° F.

Another general object of the present invention to provide a method and apparatus that will also measure flow rates of fluids, such as liquids, gases, or vapors, under high or low pressure conditions at temperatures in the cryogenic range.

A more specific object of the present invention is to provide a method and apparatus for detecting fluid flow rates that is independent of the operating temperature limitations of conventional electronic circuitry and instrumentation components.

Another specific object of the present invention is to provide a method and apparatus for detecting fluid flow rates that is limited in its upper temperature ranges only by the effective melting points of the materials utilized to construct the sensor and probe portions of the device.

Yet another specific object of the present invention is to provide a flow meter that has signal generating apparatus that can be fabricated of high temperature and corrosion resistant materials for generating a flow rate related signal in a fluid flow stream and which has electronic signal sensing and measuring components remote from the signal generating apparatus where such electronics is not exposed to the temperature, vibration, and noise extremes of the flow line or pipe.

Still another specific object of the present invention is to provide a method and apparatus that applies the power transmission line principles, rather than traditional instrumentation theories, to accomplish the preceding objectives.

Still a further object of the present invention is to provide a signal output from the temperature and corrosion resistant probe section of the flow meter that can be detected accurately and analyzed precisely by conventional electronic methods, such as phase shift detection, amplitude modulation detection, or time domain reflectometry, and which utilizes conventional electronic equipment, so as to minimize costs.

A further specific object of the present invention is to provide a reliable extreme temperature, corrosion, and vibration resistant flow meter probe that can be installed in, removed from, or maintained in a pressurized fluid flow line without the necessity of stopping flow within the line and which can be adapted or designed for a wide variation of sizes of pipe or conduit.

Additional objects, advantages, and novel features of the present invention will be set forth in part in the description that follows, and in part will become apparent to persons skilled in the art upon examination of the following or may be learned by the practice of the invention. The objects and advantages of the invention may be realized and attained by means of the instrumentalities and in combinations particularly pointed out in the appended claims.

To achieve the foregoing and other objects and in accordance with the purpose of the present invention as embodied and broadly described herein, the method of this invention may comprise the creation of a standing wave in an open line, in accordance with transmission theory; the creation of a varying capacitance, in accordance with standard electrical theory; causing the variation of capacitance to cause measurable variations such as phase shift, amplitude modulations, and the like within the standing wave; measuring the phase shift, amplitude modulation, or other variations in the standing wave, and correlating these phenomena to the flow rate of materials within a conduit. The method also includes constructing a probe of very high-temperature resistant materials, and sensing signal output for the probe at a thermally-separated distance from the high-temperature detection area so that conventional electronics operating within conventional temperature parameters may be utilized to detect flow of extremely high or extremely low temperature fluids under high, medium, or low pressure conditions.

The apparatus of the invention may comprise a signal generator portion for generating a standing wave; a coaxial cable portion, for creation of the standing wave, for physical removal of electronic components from high heat conditions, and for conducting signal output to the detector portion of the electronics; a probe portion attached to said coaxial cable portion for insertion into the extremely high or extremely low temperature flow stream within the conduit; an electronic signal processing portion for sensing variations in the standing wave, and for correlating those variations with flow rates of the stream within the conduit or pipe; and an insertion and extraction means.

Further, the probe portion of the apparatus comprises a tube with a central conductor, a central conductor terminal tip, and a rotor assembly which terminates the distal end of the probe; insulators and thermal barriers for maintaining electrical separation of the central conductor and the outer portion of the probe, and for stopping the conductance of heat to the electronic portion of the apparatus; and a coaxial cable connecting point at the proximal end, for attachment of said coaxial cable. The relationship between said central conductor terminal tip, which is subsequently called the sensor tip or plate, and the ends of the blades of the rotor assembly is such that when a voltage is applied at a given frequency to the coaxial cable portion, the probe portion also acts as a coaxial conductor, with the outer case of the probe tube and the rotor assembly forming the outer conductor, and the central conductor of the probe forming the other. When this occurs, the tip of each successive rotor blade will form one plate of a capacitor, with the central conductor terminal end (sensor tip) forming the other plate, and with the fluid flowing within the conduit comprising the dielectric of the capacitor. Thus, the sole electronic component of the circuit that is exposed to extreme temperatures or corrosive fluids can be constructed entirely of materials suited to function at and resist those extreme temperatures or fluid characteristics.

A significant feature of this invention is the generation of pulses by changing capacitance with this temperature-resistant sensing apparatus, thus creating changes in a standing wave which are proportional to the flow of a fluid in a conduit or pipe and which can be sensed by conventional electronics operating away from the environment of temperature extremes well beyond their limits.

BRIEF DESCRIPTION OF THE DRAWINGS

The accompanying drawings, which are incorporated in and form a part of the specification, illustrate the preferred embodiments of the present invention, and together with the description, serve to explain the principles of the invention. In the drawings:

FIG. 1 is a side elevation view of the entire flow meter assembly of the present invention including the line insertion apparatus positioned through a gate valve in a flow pipe;

FIG. 2 is a cross-sectional side view taken through the longitudinal axis of the high temperature probe tube assembly of the present invention;

DETAILED DESCRIPTION OF THE PREFERRED EMBODIMENTS

Figure 2A:
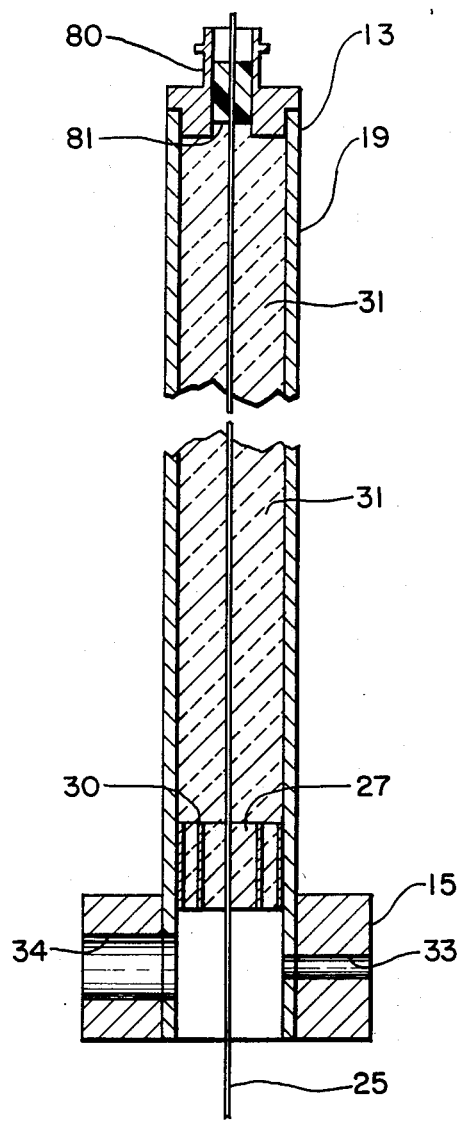
FIG. 2a is a cross-sectional side view taken through the longitudinal axis of the thermal barrier extension portion of the probe assembly.

An extreme temperature flow meter 10 according to the present invention is shown in FIG. 1. It comprises a tuned high-temperature probe portion 20 having a capacitance sensor tip 40 at its lower end, a flow sensing capacitance rotor 50 mounted on the sensor tip 41, a thermal barrier extension portion 13 mounted in a packing seal assembly 17, a coaxial wire connector housing 12, coaxial conduit 14 connecting the probe portion 20 to sensing and preamplifier circuitry (not shown in FIG. 1), a junction assembly 15 for joining the probe portion 20 to the heat sink/thermal barrier portion 13, an orientation handle 16, and a pressure tap 18. The packing seal assembly 17 has a flange 110 adapted to attach to a conventional gate valve body 112 welded on a flow pipe P. A hole 114 in the flow pipe P opens into the interior of the gate valve body 112 and admits the lower end of probe portion 20 into the flow pipe 12. When the probe portion 20 with the rotor so attached thereto is retracted by mechanism 11 above the gate 116 of valve 100, the gate can be closed. Then the flow meter 10 can be detached from the gate valve 100 at flange 110 and removed from the flow pipe P. Of course, insertion of the flow meter 10 into the flow pipe P is accomplished in the reverse order. A conventional insertion mechanism 11 can be provided to assist in holding the flow meter 10 and for inserting and retracting the flow meter 10 from the pipe P.

The high-temperature probe portion 20 of the flow meter 10 is shown in greater detail in FIGS. 2, 3, 4, 5, 6, and 7. The probe comprises an elongated tube, the outer portions 21, 22, 23, and 24 of which are fabricated from an electrically conductive and preferably corrosion-resistant material able to withstand temperatures of 1000° F. or higher, such as stainless steel. A central conductor wire 25 of heat-resistant material, such as tungsten carbide or stainless steel, terminates at a flattened distal end plate 41, which serves as one plate of a capacitor. The purpose and function of this capacitor will be described in more detail below.

Pressure seals/heat barriers 26, 27 of temperature-resistant material, such as alumina, are provided. Ceramic insulators 28, 29, and 42 hold conductor 25 in place, and they also serve as portions of the pressure seal that seals the pressure in the flow pipe P from the external environment. These ceramic insulators 28, 29 are capable of maintaining their structural integrity and of functioning as seals at temperatures exceeding 1000° F. A high-temperature bonding material 30 is utilized to hold pressure seal/heat barrier portion 27 and insulator 29 in place. A temperature-resistant filler material 31 that is a thermal insulator as well as an electrical insulator is used as an additional heat barrier and also helps to support the wire 25 extending through the middle of tube 22.

An adapter portion 44 is provided on the bottom end of tube 22 for mounting a high-temperature rotor 50 (FIG. 1) to the probe tube 20 and for providing an attachment means for the probe tube conductor 25 at 47. To compensate for differing rates of thermal expansion of the probe tube case portions 21, 22, 23, and 24, and the conductor element 25, a coiled portion 46 of conductor element 25 is provided.

During manufacture of the probe 20, moisture within the probe interior is eliminated by heating the probe 20 to approximately 900° F. or higher, so that moisture evaporates and exits through hole 32, which is then sealed before probe tube 20 cools. Holes 33 and 34 shown in FIG. 2 are provided for insertion of the orientation handle 16 of FIG. 1. The distal portion of the tube case portion 24 is narrowed so that the base 52 of rotor a assembly 50, as shown in FIGS. 4, 5, 6, and 7, can be attached.

Figure 8:
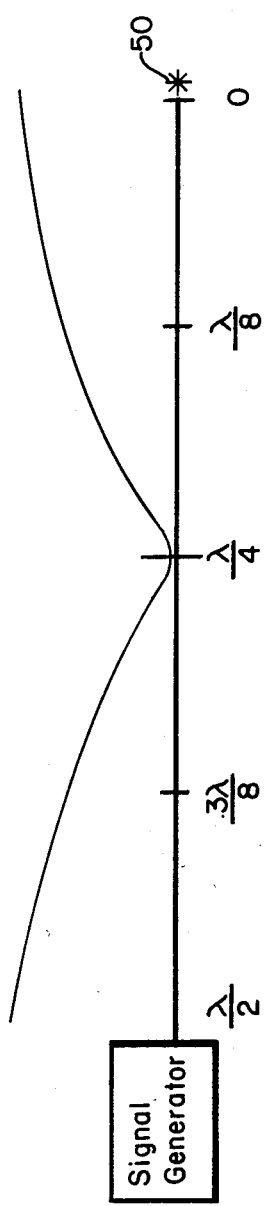
FIG. 8 is a diagrammatic representation of the upper portion of the standing wave that is generated within the tuned portion of the present invention.

The length of the probe tube assembly, including probe portion 20 of FIG. 2 and thermal barrier extension 13 of FIG. 2a from distal tip or capacitor plate 41 to the coaxial cable connector 80 is ¼ wave length of the signal produced by the signal generator 75 shown in FIGS. 8, 10, and 11 operating at a desired frequency, as will be described in more detail below. The length of the coaxial cable 14 and probe tube assembly 20 and 13 of FIG. 1 is slightly longer than one half of the wave length of the signal produced by said signal generator 75, thus forming a circuit tuned for a particular corresponding frequency, as will be described in more detail below.

Figure 3:
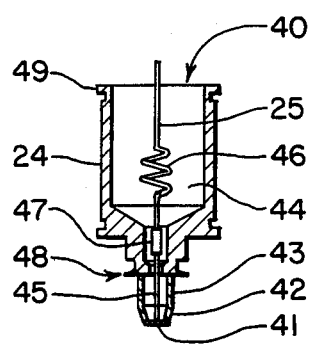
FIG. 3 is a cross-sectional side view taken through the longitudinal axis of the capacitance sensor portion of the high temperature probe tube assembly.

The capacitance sensor 40 portion of probe 20 as shown in FIG. 2 is further illustrated in FIG. 3. A high-temperature tip 48 preferably comprises a central conductor 45 that terminates at a flattened tip or plate 41, a high-temperature ceramic insulator 42 supporting the plate 41, and a high-temperature metallic base 43 welded to the lower end of the probe 20 case section 24 for mounting and supporting the ceramic insulator 42. The probe 20 center conductor 25 is welded to conductor 45 in sleeve 47. Shoulder portion 49 of the case section 24 provides an attachment point for base 52 of rotor 50 which is illustrated in more detail in FIGS. 4, 5, 6, and 7.

Figure 4:
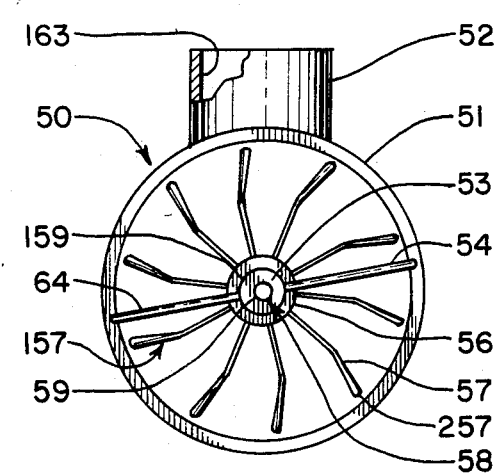
FIG. 4 is an end elevation view of a first preferred embodiment of the rotor portion of the capacitance sensor of the present invention.
Figure 5:
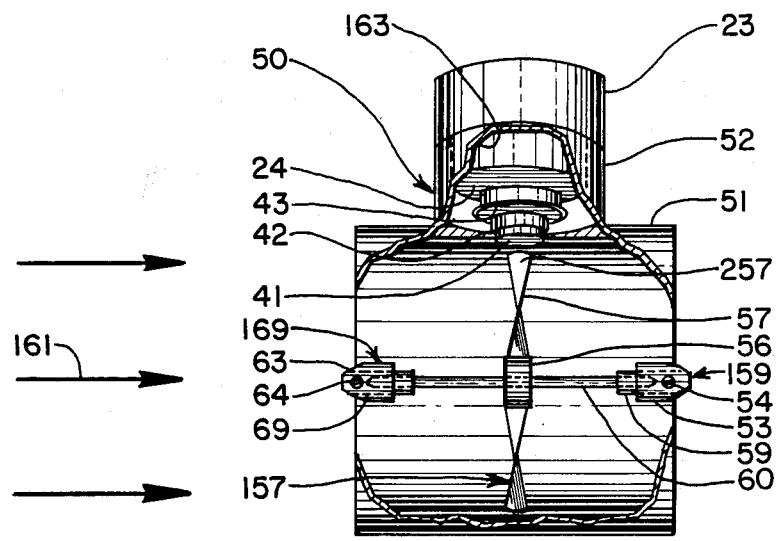
FIG. 5 is a cutaway side perspective view of the first preferred embodiment of the rotor portion of the capacitor sensor of FIG. 4 showing its relationship to the capacitance sensor tip of the probe tube.

FIGS. 4 and 5 illustrate the structure of a first preferred embodiment of the flow meter rotor assembly 50. The rotor frame 51, rotor 157, bearing assemblies 159, 169, and base 52 are constructed of electrically conductive materials that will maintain their strengths, forms, and conductivities at temperatures of 1000° F. or greater, such as stainless steel. The rotor 157 is comprised of a central hub 56 and a plurality of blades 57 attached to, and extending radially outward from, the hub 56. The hub 56 is mounted on a rotor shaft 60. Blades 57 are set at angles or twisted so that when a stream of gas or liquid flows perpendicular to the plane of the rotor 157, as indicated by arrows 161 in FIG. 5, the blades 57 and thus the rotor 157 rotates. The rotor shaft 60 is also fabricated of electrically conductive, long-wearing, high-strength material suitable for use in high-temperature conditions, such as tungsten carbide. The respective opposite ends of rotor shaft 60 are mounted in bearings 59 and 69, which are in turn mounted in respective collets 53 and 63. The rotor shaft 60 is free to rotate about its longitudinal axis in the bearings 59 and 69 while maintaining contact with them. The bearings 59, 69 are preferably bored only enough to receive the pointed ends of rotor shaft 60. Therefore, when an axial thrust is applied on the rotor 157 by the fluid flow 161, the end of the shaft 60 is pushed against the bottom of the bore in the bearing 59 to maintain electrical contact. The collets 53 and 63 are mounted in the circular frame 51 by respective mounting struts 54 and 64, which extend radially inward from the annular rotor frame 51 to the collets 53, 63. The bearings 59 and 69 are held in proper position in collets 53 and 63 by set screws 58. The central opening 163 of the rotor base 52 is sized to fit over the outer case 24 of the capacitance sensor tip 40.

Figure 6:
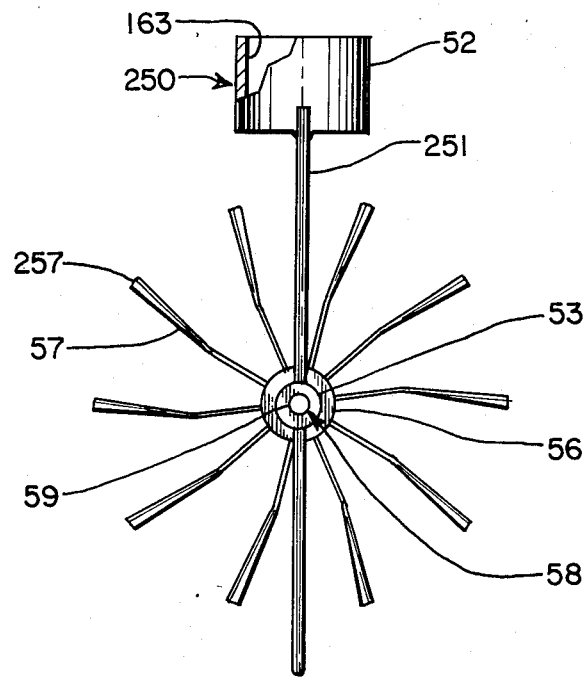
FIG. 6 is an end elevation view of a second preferred embodiment of the rotor portion of the capacitance sensor of the present invention.
Figure 7:
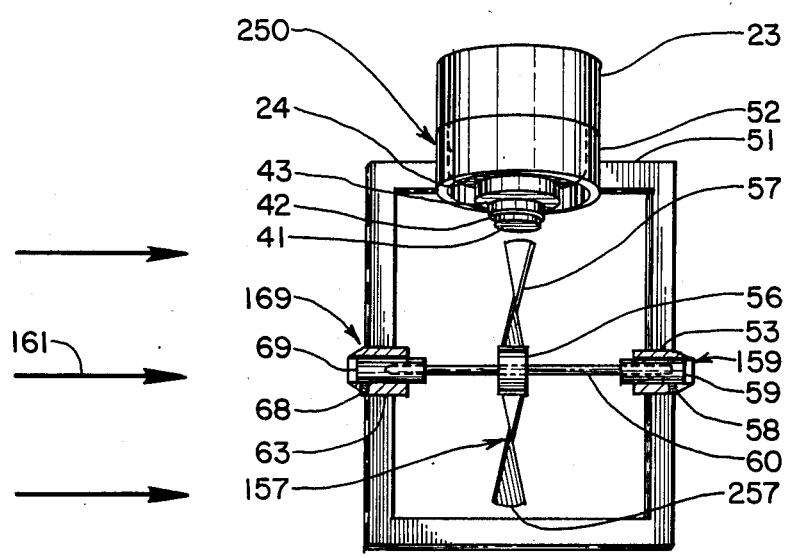
FIG. 7 is a perspective view of the second preferred embodiment of the rotor portion of the capacitance sensor of FIG. 5 showing its relationship to the capacitance sensor end of the probe tube.

FIGS. 6 and 7 illustrate the structure of a second preferred embodiment 250 of the flow meter rotor assembly. The principal difference between the first and second embodiments is that the first embodiment 50 has an annular frame 51 that forms a flow-conditioning envelope around the rotor 157, and the second embodiment 250 has a rectangular frame 251 that simply provides a mounting and support structure for the bearings 59, 69. This rectangular frame design more easily accommodates rotors with large blades 57, and it eliminates the need for mounting struts 54, 64 for the rotor shaft and bearing assembly. In all other respects, the first and second embodiments 50, 250 of the rotor assembly are functionally the same.

When the probe 20 is assembled and inserted properly into a pipe section P, as shown in FIG. 1, the rotor assembly 50 of the probe will be located in the center of the pipe in smaller diameter pipes, and at a point equal to ¼ of the diameter of the pipe in larger-diameter pipes. It is oriented so that the plane in which the rotor blades 57 turn is perpendicular to the fluid flow. Orientation handle 16 points in the same direction as the rotor shaft 60 and provides an external means of aligning the rotor 50 with respect to the fluid flow in the pipe P.

Heat barrier extension portion 13 of probe 20 is a tube of a material having the same characteristics as that comprising the outer case portions 21, 22, 23, and 24 of probe 20 according to FIG. 2, and is filled with a similar insulating material 31, as shown in FIG. 2a. Heat barrier extension 13 provides a standard coaxial cable fitting 80 at which the center conductor 25 of probe 20 terminates. This fitting 80 provides a connecting point for coaxial cable 14 of FIG. 1. Also as shown in FIG. 1, the connection point of coaxial cable 14 and heat barrier extension 13 is protected by junction box 12. Coaxial cable 14 connects probe 20 to the signal generator 75 and preamplifier circuitry of FIGS. 10 and 11, which will be described in more detail below.

In FIGS. 1, 2, and 3, the outer case portions of the heat barrier extension 13 and probe 20, and the entire structure of the rotor assembly 50, being connected and conductive, act as the outer conductor of a coaxial transmission line, and they are connected to the outer conductor of coaxial cable 14, which serves as a further extension of the transmission line. The center conductor 25 of probe 20 in FIG. 2 extends through heat barrier 13 in FIG. 2a to the coaxial connector 80 and acts as the inner conductor of a transmission line. The center conductor 45 of capacitance sensor 40 in FIG. 3 and the center conductor of coaxial cable 14 in FIG. 1 are also connected electrically to the center conductor 25 of FIG. 2 and 2a and act as further extensions of the transmission line inner coaxial conductor.

As described above and shown in FIG. 3, the inner conductor 25 of the transmission line terminates at plate 41. The outer conductor of the transmission line formed by the case of the probe 20 terminates at the rotor assembly 50 shown in FIGS. 1, 4, and 5. Therefore, the transmission line is essentially an open circuit at the plate 41 and rotor assembly 50, except for the capacitance between the plate 41 and rotor assembly 50. Thus, the tip or plate 41 of capacitance sensor 40 forms one plate of a capacitor, and the outer tip 257 of each rotor blade 57, as it passes in close proximity to the tip 41 of sensor tip 40, forms the other plate of the capacitor. Air, steam, liquid, or other fluid flowing in the pipe P forms the dielectric of the capacitor.

FIGS. 5 and 7 illustrate the relationship between the tips 257 of blades 57 and the capacitance sensor tip or plate 41. As the fluid flow forces the rotor blades 57 to rotate, each successive blade 57 approaches the plate 41 of sensor 40. As a given blade tip 257 approaches the sensor plate 41, the amount of dielectric between the blade 57 and the sensor plate 41 decreases until it reaches a minimum when the blade tip 257 is positioned directly adjacent the sensor plate 41. It then follows that the capacitance at the sensor 40 end of the probe 20 alternately increases and decreases with the passage of successive blade tips 257 adjacent the plate 41. Capacitance is least at the halfway point of rotation between blade tips 257, and greatest as each successive blade tip 257 is closest to sensor tip 41. The rate of rotation of rotor blades 57 varies in direct proportion to the flow rate of the gas, liquid, or vapor past the rotor in the pipe P. Thus, the rate of change of capacitance varies in relation to flow past the rotor 50, thereby causing rate of change of capacitive reactance $X_c$ to vary in relation to flow rate. This direct relationship between rate of change of capacitance and of capacitive reactance to flow rate of the fluid in the pipe P is used to operate a flow meter according to this invention.

The operative concept of this invention departs from conventional instrumentation techniques and utilizes instead the phenomenon of a current standing wave in a nearly open-circuit transmission line. Essentially, in transmission line theory, when an alternating electromotive force is applied at a given frequency to an open length of wire or conductor, a reflected sinusoidal wave equal in magnitude and opposite in phase to the original current wave is created. At any given point, the arithmetic sum of the amplitudes of the original wave and the reflected wave is zero at all points along the open conductor. Such a wave is called a standing wave. The plot of a rectified standing wave having a wave length $\lambda$ is illustrated in FIG. 8. The slope of the wave form is greatest near the node which occurs at $\lambda/4$ in FIG. 8. This area of greatest slope is utilized in this invention for extracting a very accurate, distinct, and dependable instrumentation signal that is indicative of flow rate, because, as will be described below, it is the most sensitive to changes in the system. For example, changes in reactance, such as changes in capacitance, at the nearly open end of the circuit can yield data of most interest and sensitivity for measurement purposes according to this invention.

Figure 9:
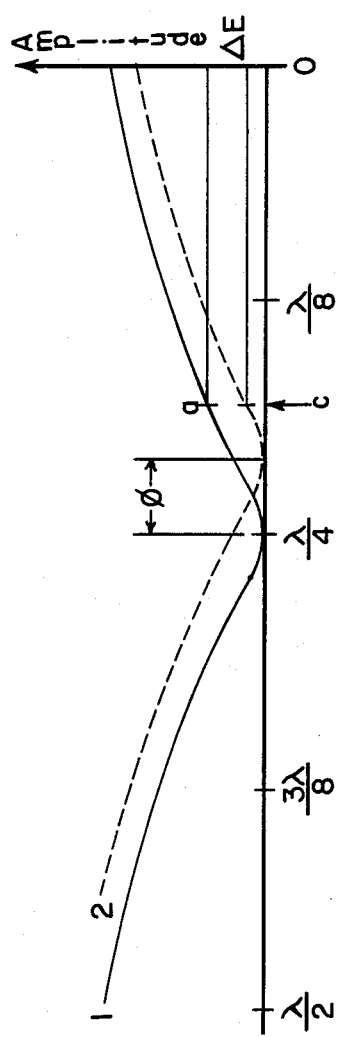
FIG. 9 is diagrammatic representation of the phase shift and of the change of amplitude with respect to a fixed point of the standing wave according to the present invention.

It is possible to introduce electrical changes at the open end of the conductor will cause a shift $\phi$ of the phase angle $\theta$ of the standing wave as illustrated in FIG. 9.

As mentioned above, one means of inducing phase shift $\phi$ in the standing wave from the open end of the conductor 25 is to introduce changes in the impedance, such as a capacitive reactance, at the open end of the conductor 25. Total circuit impedance Z is comprised of the sum of resistance R to current flow, inductive reactance $X_L$; and capacitative reactance $X_c$. For the circuit of the present invention, the emf introduced into the fixed conductor 25 of the coaxial cable 14 and probe 20 is constant, and resistance R is constant with respect to any given point. There are no inductive components in the circuit, so $X_L=0$. However there is a capacitive reactance $X_c$, because the rotor assembly blade tips 257 and the sensor plate 41 of the probe 20 at the end of the conductive wire 25 form a capacitor as described above. Further, the capacitance varies because the distance and the amount of dielectric (gas, steam, or liquid) between the blade tip 257 and sensor plate 41 varies as the blades 57 rotate due to flow of the dielectric fluid in the pipe P. Capacitative reactance is represented by the formula $$X_c = 1/(2\pi C f)$$

where C is capacitance of the circuit, and f is the frequency of the electromotive force. Thus, for a fixed frequency, such as that used in the present invention, $X_c$ changes in inverse relation to C. Further, in electrical theory, it is widely accepted that $$\tan\theta = x/r$$

where $\theta$ is the phase angle of a given sine wave, X is circuit reactance, and R is circuit resistance. Since R is constant, and $X_L=0$, the tangent of the phase angle $\theta$ and resultantly, $\theta$ itself, is directly proportional to changes of the capacitive reactance, and inversely proportional to changes in capacitance. Consequently, the change of capacitance caused by the passage of each rotor blade tip 257 past the sensor plate 41 of the probe 20 in the flowing fluid produces changes in the phase angle θ (shown as phase shift φ in FIGS. 9 and 11) and changes in amplitude with respect to a given point (amplitude modulation) in a standing wave (shown as ΔE in FIGS. 9 and 10). These changes are most apparent and measurable near a node in the standing wave which occurs ¼ wave length (λ/4) distance away from the point of reflection of the original wave, which point of reflection is coincident with the capacitor plate 41 of the probe 20. Because any given point on the curve of the wave form represents the amplitude of the electromotive force for a given phase angle θ, one can see that with reference to a fixed point c along the conductor 25, the amplitude will change as the phase angle φ shifts. For example, as illustrated in FIG. 9, with respect to fixed reference point c along the conductor, the amplitude of point a on the waveform 1 at c is greater than the amplitude of point b on the wave form 2 at c after a phase shift φ. It is possible, through conventional electrical components to measure both the phase shift φ and the change in amplitude ΔE. It is also possible according to this invention to detect and/or measure the rate of reciprocation back and forth of successive phase shifts φ of the standing wave as well as the rate of oscillation of amplitude E up and down between the a and b positions. Further, these changes in the standing wave are coincident with the passage of each blade tip 257 of a rotating rotor blade 57 adjacent plate 41, and the rate of rotation of rotor 50 is directly proportional to average flow of a fluid in the pipe P. Consequently, the rate of change in the standing wave i.e., the reciprocating rate of the phase shift φ on the conductor 25 or the rate of induced oscillation of amplitude ΔE at point c is proportional to the flow rate of the fluid.

Selection of an initial frequency f in the range of 50-200 megahertz has the benefit of providing capacitance values which in turn provide capacitive reactance values that will yield sufficient phase shift and amplitude modulations in the standing wave for easy and practical measurement. This frequency range also has the additional benefit of placing the null point of the standing wave, which occurs at a point ¼ wave length away from the sensor plate 41, a substantial distance away from the hot and noisy environment of the fluid flowing in the pipe P. Coincidently, since region near the null point provides the most sensitive measurable change in amplitude or phase shift φ, it advantageously enables the detector electronics to be positioned a substantial distance from the pipe environment to have adequate thermal barriers separating the detector electronics from the extreme temperature and noise environment of the pipe P. Therefore, the more sensitive detector electronic equipment can be located some distance remote from the immediate harsh environment of the pipeline where it is unaffected by the extreme temperatures of, or electronic and mechanical "noise" surrounding, the fluid being measured. Further, such a signal in the range of 50 to 200 MHZ can be generated by existing, relatively inexpensive off-the-shelf equipment. Further, because the probe 20 and coaxial cable 14 comprise a tuned circuit for a given frequency, different probe lengths and sizes for additional ranges of pipeline sizes are avaiable simply by generating an input signal of different frequency range (wavelength).

Figure 10:
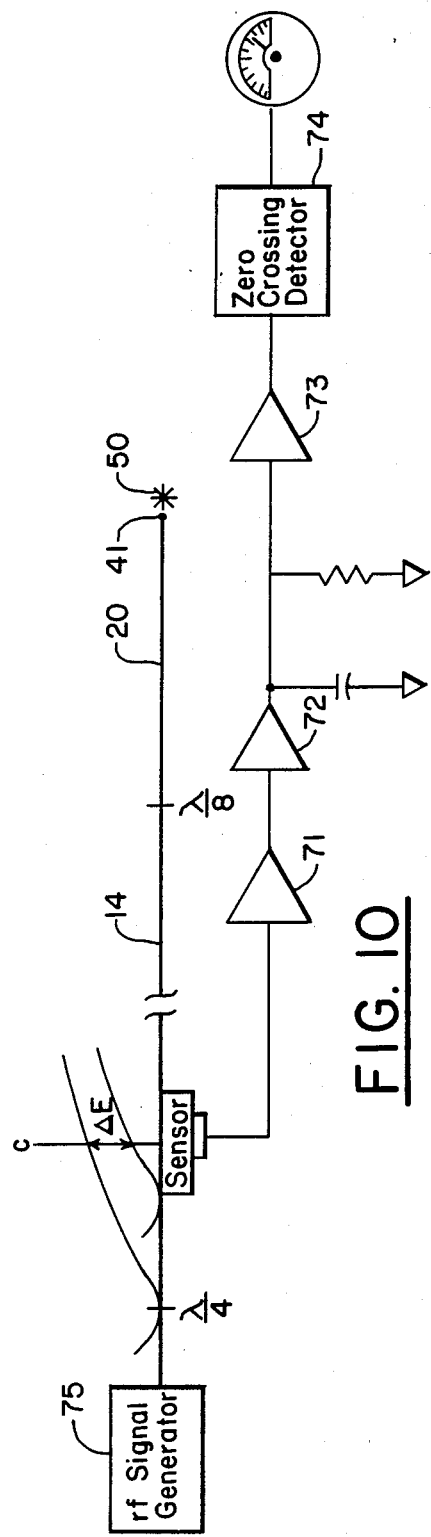
FIG. 10 is a diagrammatic representation of the preferred embodiment electronics associated with measuring the amplitude change of the standing wave with respect to a fixed point utilized in the present invention.
Figure 11:
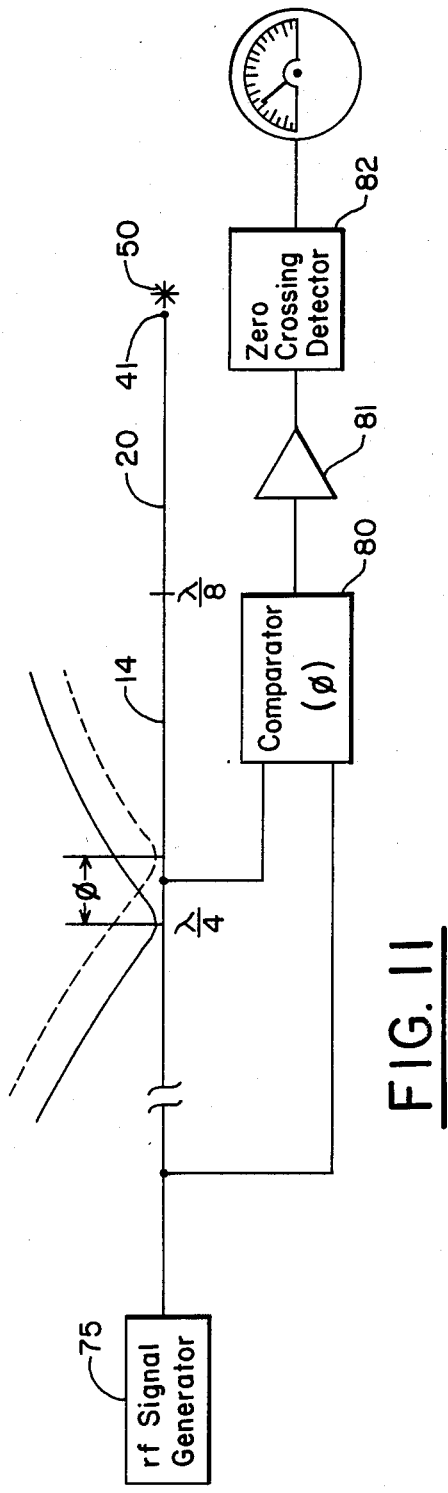
FIG. 11 is a diagrammatic representation of the preferred embodiment electronics associated with measuring the phase shift of the standing wave utilized in the present invention.

When probe 20, thermal barrier extension 13, and coaxial cable 14 are connected, they form an open, tuned, circuit of a length slightly longer than ¼ wave length of the frequency introduced by the frequency or signal generator 75 shown in FIGS. 10 and 11. The probe 20 and thermal barrier extension 13 are approximately ⅛ wave length when they are joined together in the preferred embodiment.

In sensing amplitude modulation and phase shift within the standing wave, electrical detectors are positioned just to one side or the other of the node at λ/4 depicted in FIGS. 10 and 11, where the slope of the sinusoidal standing wave form is steepest. In sensing changes in the reflected wave and comparing them to the original wave form parameters, such as can be accomplished in time domain reflectometry, the detector is collocated with the point of introduction of the radiated wave.

In FIG. 10, the changes in amplitude ΔE (amplitude modulation) of the standing wave with respect to a reference point c are detected by a sensor 70, such as a coil or other conventional sensor device, located at or near the reference point c. Signal output of this sensor 70 is fed to a preamplifier section consisting of an RF amplifier 71, amplitude modulation (AM) detector 72, op amp 73, and zero crossing detector 74. The signal from the sensor 70 is first amplified by the radio frequency amplifier 71, then fed to the amplitude modulation detector 72, which filters out the carrier frequency generated by the signal generator 75, leaving only the changes (pulses) of amplitude due to the amplitude modulation ΔE. The op amp 73 then amplifies these small signals, which are in the form of a sine wave having positive and negative values. The amplified signals are then fed to the zero crossing detector 74, which amplifies the signals again and generates a square wave, each pulse of which is indicative of the passage of a single blade tip 257 of the rotor assembly 50. The pulses of the square wave are then fed from the preamplifier section to commonly available circuitry which correlates the pulses to a flow rate, and provides a real-time flow rate readout to the user.

The method of measurement of phase shift φ, is shown by FIG. 11. A comparator 80, such as a standing wave ratio meter, detects the phase angle θ of the incident wave and the reflected wave components of the standing wave. Using the phase angle θ of the incident wave as a zero reference, the phase angle of the reflected wave is measured after it is altered by the change of capacitance induced by the rotation of the rotor 157. From this, the comparator 80 determines the rate of reciprocation of the phase shift φ, and sends this signal to a low frequency amplifier 81, which amplifies the signal, sending it in turn to a zero crossing detector 82, which again amplifies the signal and converts the changes in θ to square wave pulses, each of which correlates to the crossing of the sensor plate 41 by a single rotor blade tip 257. The comparator, low frequency amplifier, and zero crossing detector of this arrangement are considered a preamplifier. The preamplifier output is then fed to any of a number of available amplifiers/signal processors which correlate the rate of rotor blade rotation to the flow of vapor, gas, or liquid, and provide a readout to the user.

The probe outer case, rotor assembly, and portions of the sensor tip are fabricated of high-strength, conductive, and corrosion-resistant materials able to withstand temperatures greater than 1000° F., such as stainless steel. The center conductor is fabricated of similar temperature-resistant material, although high strength and corrosion resistance is not required. Insulators and adhesives are nonconductive and must remain so and maintain their strength at temperatures greater than 1000° F. as well as at cryogenic temperatures. Ceramic insulators are well-suited for this application. Additional portions of the thermal barriers that hold the insulators in place and provide the pressure seals must withstand high and low temperature extremes as well as high pressures. Alumina is well-suited for this purpose. Material selected as a filler/additional thermal barrier need not possess high strength or pressure-resistant characteristics, but must resist electrical conductivity and thermal high and low temperatures.

It can be readily seen that as the temperature resistance of new materials of appropriate electrical conductivity and strength characteristics increases, the upper and lower temperature limits of a probe of the design of the present invention are extended by a like amount. The temperature range of the design of the present invention is limited by that of the component materials, not by the design itself.

The foregoing is considered illustrative only of the principles of the invention. Further, since numerous modification and changes will readily occur by those skilled in the art, it is not desired to limit the invention to the exact construction and operation shown and described. For example, other methods, such as time domain reflectometry, exist by which to measure the variations induced into the standing wave and to correlate these variations with the flow of a measured substance. Accordingly, all suitable modifications and equivalents may be resorted to falling within the scope of the invention by the claims which follow.

The embodiments of the invention in which an exclusive property or privilege is claimed are defined as follows:

1. Apparatus for determining the flow rate of a fluid flowing in a pipeline, comprising:
    probe means for insertion into said pipeline for detecting the flow of said fluid;
    electronic generator means connected to said probe means for generating a standing wave in said probe means;
    impedance means connected to said probe means for causing variations of phase angle and amplitude in said standing wave in relation to the flow of said fluid; and
    sensing means connected to said probe means for detecting said variations in said standing wave.

2. The apparatus of claim 2, wherein said probe means includes a transmission line comprised of a first electrical conductor and a second electrical conductor, both of which are connected to said generator means and both of which terminate in an essentially open circuit.

3. The apparatus of claim 2, wherein said impedance means includes variable capacitor means positioned in said transmission line for varying capacitance in said transmission line in correlation with the rate of fluid flowing in the pipeline.

4. The apparatus of claim 3, wherein said first and second electrical conductors terminate adjacent each other in the flowing fluid, and said variable capacitor means includes rotor means positioned in said flowing fluid adjacent said terminal ends of said first and second electrical conductors for varying the capacitance in said transmission line, said rotor means including drive means for rotating said rotor means in relation to the rate of fluid flowing in the pipeline.

5. The apparatus of claim 4, wherein said drive means includes a plurality of blades on said rotor for interacting with the flowing fluid to rotate said rotor.

6. The apparatus of claim 5, wherein said blades are electrical conductors and are positioned to pass close enough to said terminal ends of said conductors to vary the capacitance of the transmission line as they pass said conductors.

7. Apparatus for determining the flow rate of fluid flowing in a pipeline, comprising:
    a probe with a tube portion having a proximal end and a distal end with a rotor rotatably mounted at said distal end adapted for insertion into the fluid in the pipeline, said proximal end being adapted for mounting on the pipeline, and said rotor having a plurality of blades adapted to interact with the flowing fluid to cause rotation of said rotor, said probe also having an elongated conductor extending coaxially through, but electrically insulated from, said tube portion and terminating in a capacitive element forming a first plate adjacent said rotor, said tube portion being electrically conductive, said blades of said rotor forming a part of a capacitor in combination with said capacitive element, and said rotor being positioned in such a manner that said blades pass into and out of close proximity to said capacitive element to cause variations in capacitance as said rotor rotates;
    electronic generator means connected to said elongated conductor and to said probe for inducing an alternating emf and a standing wave on said elongated conductor; and
    sensing means connected to said probe for detecting variations in the standing wave induced by said variations in capacitance at said first plate.

8. The apparatus of claim 7, wherein said rotor is a part of a rotor assembly that is electrically connected to said tube portion and is electrically conductive throughout its structure and forms a second plate of said capacitor.

9. The apparatus of claim 8, wherein said probe means also comprises insulation means which serve to provide electrical isolation of said conductor and said tube portion of the probe means and which inhibit conductivity of heat and provide pressure seals, and
    attachment means for coaxial cable for terminating the proximal ends of said conductor and tube portion and for providing electrical connection of said conductor and said tube portion to said electronic generator means.

10. The apparatus of claim 9, wherein said rotor has a rotating portion comprising bearings, a shaft, a hub, and blades which are positioned to rotate past said distal end of said probe; each of said blades having a tip that, when rotating past said capacitive element forms a second plate of the capacitor, and said flowing fluid forms the dielectric of said capacitor, and wherein said capacitor is positioned at the location of the peak amplitude of said standing wave.

11. The apparatus of claim 10, wherein said rotor includes a cylindrical base for attachment to said distal end of said tube portion, a cylindrical frame attached to said base for housing said rotor, said rotor having a rate of rotation that is proportional to the flow of a fluid past said rotor, and attachment struts for connecting said rotor bearings to said frame.

12. The apparatus of claim 10, wherein said rotor comprises a cylindrical base for attachment to said distal end of said tube portion, a frame that is rectangular in plan and thin in section, which frame supports said rotor and provides attachment means for said bearings, shaft, rotor hub, and blades, said rotor portion having a rate of rotation that is proportional to the flow of said flow past said blades.

13. The apparatus of claim 12, wherein said conductor, rotor, and tube portion, are comprised of electrically conductive materials which maintain strength at temperatures ranging from cryogenic to greater than 1000° F. and said insulation means are comprised of electrically nonconductive materials which do not lose their nonconductive qualities and which maintain their strength at temperatures ranging from cryogenic to greater than 1000° F. and which conductive and nonconductive materials are jointed by nonconductive adhesive materials and means which maintain strength and bond throughout said temperature range between cryogenic to greater than 1000° F.

14. The apparatus of claim 2, wherein said electronic generator means comprises:
 a signal generator for generating a sinusoidal wave form output;
 a coaxial cable for connecting said signal generator output to said probe means; and
 a combination of said coaxial cable and said probe that yields an open tuned circuit for generation of said standing wave, said circuit being approximately one fourth the wave length of said standing wave.

15. The apparatus of claim 14, in which the standing wave is positioned within said tuned circuit so that its maximum amplitude occurs at said open end of said tuned circuit, and its null occurs just prior to the end of the circuit at which said sinusoidal wave form is introduced by the signal generator.

16. The apparatus of claim 14, wherein the coaxial cable and the probe means are each equal to approximately ⅛ of the length of the wave length of the standing wave.

17. The apparatus of claim 14, wherein the length of said probe may be increased in length and said coaxial cable shortened by a similar length, so that the length of said tuned circuit remains constant, but the length of said probe may be varied to accommodate different pipeline diameters.

18. The apparatus of claim 14, wherein the length of said tuned circuit may be multiplied by an integral amount so as to allow for greater probe lengths to accommodate larger pipeline diameters.

19. The apparatus of claim 14, in which the frequency of said sinusoidal wave form is in the range of about 50 to 200 MHZ.

20. The apparatus of claim 19, in which the frequency of said sinusoidal wave form is about 72 MHZ.

21. The apparatus of claim 20, wherein the capacitance created at the tip of said probe by rotation of said rotor portion, after introduction of a sinusoidal wave form oscillating at 72 MHZ is approximately 0.07 picofarads.

22. The apparatus of claim 1, including sensing means connected to said probe means for detecting said variations in said standing wave.

23. The apparatus of claim 22, in which the sensing means is positioned near a null point of said standing wave where the slope of the curve of said standing wave is the greatest.

24. The apparatus of claim 23, in which said sensing means is a detector of modulations in the amplitude of the standing wave with respect to a given point on said probe means wherein said sensor is located, and that produces an output related to the modulation of the amplitude of the standing wave.

25. The apparatus of claim 23, in which said sensing means is a detector of shifts in the phase angle of the standing wave and creates an output related to the shift of the phase angle.

26. The apparatus of claim 13, including sensing means connected to said transmission line for detecting said variations in said standing wave, and instrumentation means connected to said sensing means for converting said detected variations in said standing wave to fluid flow rates.

27. The apparatus of claim 26, wherein said sensing means is positioned near a null point of said standing wave and is a detector of modulations in amplitude of the standing wave with respect of a given point on the transmission line and produces an output related to the modulation of the amplitude of the standing wave.

28. The apparatus of claim 27, in which said calculating means convert said output of said amplitude modulations sensing means to a signal that correlates directly to the passage of the individual tips of said rotor blades, which in turn is directly related to the flow rate of said fluid.

29. The apparatus of claim 26, wherein said sensing means is positioned near a null point of said standing wave and is a detector of shifts in the phase angle of the standing wave and produces an output related to the shift of the phase angle of the standing wave.

30. The apparatus of claim 29, in which said calculating means convert said output of such phase shift sensing means to a signal that correlates directly to the passage of the individual tips of said rotor blades, which is in turn directly related to the flow rate of said fluid.

31. The apparatus of claim 26, wherein said calculating means convert said signal output of said sensing means to a signal related to the passage of said rotor blades and to a readout of flow rate of said fluid utilizing the principles of Time Domain Reflectometry.

32. The apparatus of claim 3, wherein said probe means is insertable into, and retractable out of, said pipeline without the requirement of interrupting the flow of said fluid in the pipeline.

33. The method of determining the flow rate of a fluid flowing in a pipeline, comprising the steps of:
 flowing the fluid through a chamber past a probe;
 inducing a standing wave to exist within an electrical circuit that includes the probe;
 causing changes in electrical impedance to occur in the electrical circuit in relation to the fluid flow past the probe;
 causing the changes in electrical impedance to effect changes including the amplitude and phase angle, in said standing wave;
 measuring any of the changes in said standing wave caused by the changes in electrical impedance and correlating said changes to the flow rate of said fluid flowing through said chamber.

34. The method of claim 33, including the steps of constructing said probe entirely of materials which will function at extreme temperature ranges varying from cryogenic to in excess of 1000° F.

35. The method of claim 33, including the step of changing impedance by causing changes in capacitance.

36. The method of claim 35, including the steps of causing said changes in capacitance by causing a portion of said probe that is within said chamber to function as a capacitor and causing said capacitor to change capacitance in response to the flow of said fluid.

37. The method of claim 36 including the step of providing said capacitor in a form that comprises a rotor portion having blades that have tips, forming a first plate portion of said capacitor and a sensor portion having a tip that forms the second plate portion at which said standing wave reaches maximum amplitude.

38. The method of claim 37 including the step of flowing said fluid as a dielectric between said first and second plate portions.

39. The method of claim 33 including the steps of forming said electrical circuit in conjunction with said probe in such a manner that it comprises a tuned circuit suitable for introduction of a standing wave of a given wave length.

40. The method of claim 39 including the step of tuning said circuit by providing a length that is slightly more than one fourth of a selected wave length of a standing wave of a selected frequency.

41. The method of claim 40 including the step of tuning said circuit so that it is of a length slightly more than an even integral multiple of one fourth of the selected wave length of a standing wave of the selected frequency.

42. The method of claim 39 including the steps of separating the measuring means from said range of temperatures and enabling said measuring means to operate within a temperature range of lesser extremes than the temperature range of said fluid.

43. The method of claim 33 including the steps of measuring changes in the amplitude of the standing wave and correlating these measurements to the flow of said fluid.

44. The method of claim 33 including the steps of measuring phase shifts of the standing wave and correlating these measurements to the flow of said fluid.

45. The method of claim 33 including the steps of measuring changes of said standing wave by means of Time Domain Reflectometry and correlating these measurements to the flow of said fluid.

46. The method of claim 33 including the steps of creating said standing wave by providing a frequency in the range of about 50–200 MHZ.

47. The method of claim 33 including the step of creating said standing wave by providing a frequency of about 72 MHZ.

48. The method of claim 35 including the step of producing changes of capacitance in the range of about 0.01 to 0.10 picofarads.

49. The method of claim 36 including the step of producing changes of capacitance of about 0.07 picofarads.

50. The apparatus of claim 6, wherein said blades form a part of one of said electrical conductors and pass successively near the terminal end of the other electrical conductor.

* * * * *